July 30, 1957     A. L. BARRETT     2,800,970
CREEPER BASE FOR MINING APPARATUS Original Filed Oct. 19, 1950     10 Sheets-Sheet 1

*Inventor:*
*Arthur Lee Barrett*
By *Charles F. Osgood,*
*Attorney.*

July 30, 1957 A. L. BARRETT 2,800,970
CREEPER BASE FOR MINING APPARATUS
Original Filed Oct. 19, 1950 10 Sheets-Sheet 4

Inventor:
Arthur Lee Barrett
by Charles F. Osgood,
Attorney.

Inventor:
Arthur Lee Barrett.
by Charles F. Osgood,
Attorney.

July 30, 1957  A. L. BARRETT  2,800,970
CREEPER BASE FOR MINING APPARATUS
Original Filed Oct. 19, 1950   10 Sheets-Sheet 10

Inventor:
Arthur Lee Barrett.
By Charles F. Osgood,
Attorney.

United States Patent Office 2,800,970
Patented July 30, 1957

2,800,970

CREEPER BASE FOR MINING APPARATUS

Arthur Lee Barrett, Franklin, Pa., assignor to Joy Manufacturing Company, Pittsburgh, Pa., a corporation of Pennsylvania Continuation of application Serial No. 548,725, November 23, 1955, which in turn is a continuation of application Serial No. 191,003, October 19, 1950. This application December 19, 1956, Serial No. 629,772

36 Claims. (Cl. 180—8)

This invention relates to mining apparatus and more particularly to improved moving, steering and positioning means for a continuous mining apparatus of the type adapted for use in underground mines having extremely low headroom for dislodging and disintegrating the solid mineral of a mine vein and for conveying the disintegrated mineral away from the working face to a suitable point of delivery.

Continuous mining apparatus of known types are not adapted for use in mines having extremely low headroom due to the relatively great height of such apparatus, which are usually mounted on crawler bases for propelling and steering the apparatus and such bases must inherently keep the vertical dimension of the apparatus relatively high. The present invention contemplates improvements over such known types of continuous mining apparatus in that a low height walking or creeping base structure is provided which serves to move, position and steer the apparatus while greatly reducing the overall height of the apparatus, enabling the latter to operate in mines in which the roof is extremely low, so that the continuous mining of veins heretofore considered impossible may be accomplished. The walking base structure of the present invention is not only extremely vertically compact but is also flexible in operation so that the apparatus may readily travel through the relatively restricted and sharply curved passageways of an underground mine and efficiently perform its dislodging and disintegrating functions.

An object of the present invention is to provide an improved continuous mining apparatus which is extremely low in height well adapted for use in mines having very low headroom. Another object is to provide improved supporting, positioning and moving means for such an apparatus. Yet another object is to provide an improved walking or creeping base structure for a mining apparatus whereby the latter may be moved, laterally positioned and steered in an extremely flexible manner. A further object is to provide improved means for feeding, retracting and horizontally swinging a mine vein dislodging and disintegrating mechanism of a continuous mining apparatus. A still further object is to provide an improved controlling means for the operating elements of the feeding, retracting and swinging means. Yet another object is to provide a walking or creeping base structure which is hydraulically operated and which embodies an improved hydraulic system. A still further object is to provide an improved automatic control whereby certain functions of the walking or creeping base structure may be effected in a definite and predetermined sequence. Another object is to provide an improved creeper base structure whereby the apparatus may be moved step by step over the mine floor and embodying means for swinging the apparatus horizontally step by step about an upright axis. Still another object is to provide an improved mining apparatus having novel combinations and arrangements of parts. These and other objects and advantages of the invention will, however, hereinafter more fully appear.

This application is a continuation of my copending application Serial No. 548,725, filed November 23, 1955, which is a continuation of my application Serial No. 191,003, filed October 19, 1950, both applications now abandoned.

In the accompanying drawings there are shown for purposes of illustration several forms and modifications which the invention may assume in practice.

In these drawings:

Figs. 1 and 1a, taken together, constitute a plan view of a continuous mining apparatus in which a preferred illustrative embodiment of the invention is embodied.

Figs. 2 and 2a, taken together, constitute a side elevational view of the mining apparatus shown in Figs. 1 and 1a.

Fig. 4 is a view in central longitudinal vertical section taken substantially on line 4—4 of Figs. 1 and 1a.

Fig. 7 is a cross section taken substantially on line 7—7 of Fig. 1a.

Fig. 8 is a cross section taken substantially on line 8—8 of Fig. 1a.

Figure 4:
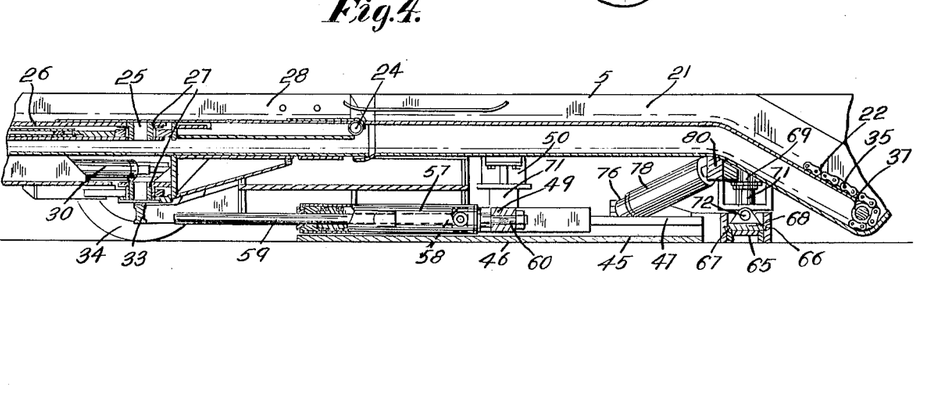

In the illustrative embodiment of the invention shown in Figs. 1 to 10 inclusive, the continuous mining apparatus with which the improved propelling, positioning and steering means or so-called walking or creeping base structure, generally designated 1, is associated, may be generally similar to that disclosed in the copending applications to John D. Russell, Serial No. 102,995 and John H. Sibley, Serial No. 102,996, both filed on July 5, 1949 and both owned by the assignee of the present invention. The mining apparatus embodies certain improvements over those disclosed in these applications, but, as in these applications, the apparatus disclosed herein embodies a mine vein dislodging and disintegrating mechanism generally designated 2 and shown in construction lines in Figs. 1 and 2. This dislodging and disintegrating mechanism includes a frame 3 projecting forwardly in advance of the base and pivoted on a horizontal axis at 4 on a main frame 5 of the apparatus to swing in a vertical plane with respect thereto, and guided for circulation in parallel, vertical orbital paths about this swingable frame are endless disintegrating chains 6 which carry disintegrating instruments 7 in the form of pointed bits. A pair of motors 9, desirably electric motors, mounted at opposite sides of the main frame near its rearward portion serve to drive the disintegrating chains 6 through longitudinal shafting 10 in a manner similar to that fully disclosed in the above mentioned Russell and Sibley applications. The hydraulic swinging mechanism for the frame 3 of the dislodging and disintegrating mechanism 2 may be generally like that disclosed in a copending application of John D. Russell, Serial No. 524,791, filed July 27, 1955, owned by the assignee of the present invention and includes upright hydraulic cylinders 11 rigidly mounted at opposite sides of the swingable frame 3 and each containing a piston connected at 12 to a lever 13 pivoted at 14 on the frame 3 and connected by a flexible chain section 15 to a curved forward portion 16 of the main frame 5. When liquid under pressure is supplied to the cylinders 11 the dislodging and disintegrating mechanism 2 may be swung upwardly about its pivot in a vertical plane relative to the main frame, and when liquid is vented from the cylinders the dislodging and disintegrating mechanism may swing downwardly by gravity, in a manner fully disclosed in the applications above referred to. The main frame 5 of the mining apparatus is of a low compact, elongated, horizontal construction and is provided with a downwardly inclined forward portion 20 extending beneath the horizontal pivot 4 of the dislodging and disintegrating mechanism, and extending along the main frame is a troughlike structure 21 in which an endless conveyor 22 is guided for circulation. This conveyor receives the disintegrated mineral discharged from the dislodging and disintegrating mechanism and serves to convey the disintegrated mineral rearwardly along the troughlike structure to discharge at the rear end of the apparatus into a suitable haulage vehicle such as a shuttle car or onto a suitable conveyor or other haulage system. The rearward portion 23 of the troughlike frame structure is pivoted at 24 on a horizontal transverse axis (Fig. 4) to swing in a vertical plane relative to the main frame 5 and this rearward tiltable portion is laterally swingable about an upright axis at 25 (Fig. 1a), thus, enabling the discharge height and the lateral position of the discharge end of the conveyor to be varied as desired. As shown in Fig. 4, the rearward frame portion 26 of the conveyor is swingable laterally about aligned vertical pivot elements 27 (Fig. 4) supported by a forward portion 28 of the vertically tiltable frame portion 23. A pair of hydraulic jacks 29, 29 is arranged between the main frame 5 and the tiltable conveyor portion 23 for tilting the latter and the rearward frame portion 26 of the conveyor is swingable laterally about the pivot element 27 by a pair of hydraulic jacks 30.

The rear end of the horizontal main frame 5 is carried by and rigidly secured to a transverse axle 33 disposed directly below the pivot 25 and on which supporting wheels 34, desirably provided with rubber tires, are journaled, and the rearward portion of the apparatus is at all times supported by this pair of wheels while the forward portion is supported by the walking base structure with the latter receiving a major portion of the weight of the apparatus, as is later explained. Also, when the main frame 5, together with the dislodging and disintegrating mechanism 2, is swung horizontally relative to the base structure, the rear axle and wheels turn horizontally in unison with the main frame about an upright axis 33' (Fig. 11) coincident with the upright axis 25. Moreover, at times, during operation of the creeper base structure, the main frame 5 may tilt in a vertical plane about the axes of the rear wheels, as will hereinafter become apparent.

The endless conveyor is of the conventional circulating endless flight type comprising a central flexible endless drive chain 35 having cross flights 36 and suitably guided for circulation relative to the troughlike structure and engaging an idler 37 at its forward receiving portion and having its rearward portion passing around a drive sprocket 38 carried by a transverse shaft 39 suitably journaled on the rear end of the rearward conveyor frame portion 26. A pair of motors 40, desirably electric motors, are mounted at the opposite sides of the rearward swingable portion of the conveyor frame and these motors are connected through conventional speed reducers 41 to conventional universal drive shafts 42, the latter in turn connected through bevel gearing contained in gear casings 43 to the opposite ends of the transverse shaft 39, for driving the conveyor. This conveyor drive structure is also fully disclosed in the copending Russell and Sibley applications above referred to.

Figure 6:
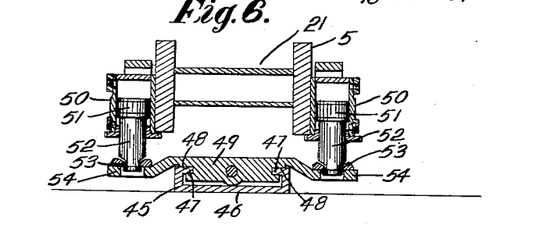
Fig. 6 is a cross section taken on line 6—6 of Fig. 1, showing the vertical elevating jacks for the bottom pan.
Figure 7:
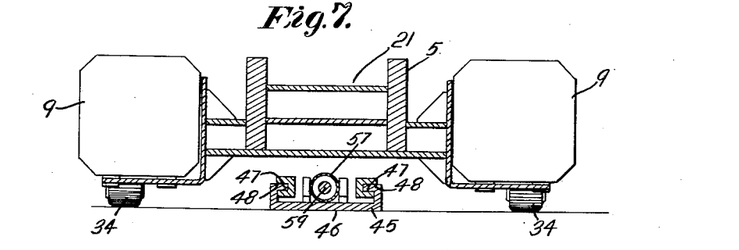
Figure 8:
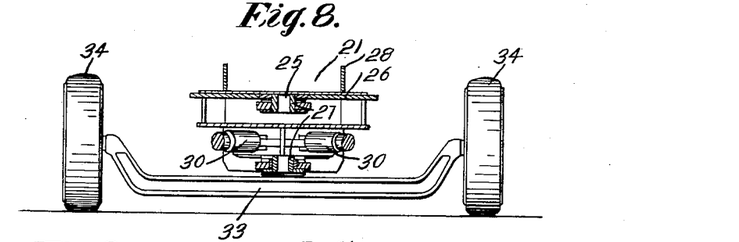

Now referring to the specific structure of the improved walking or creeper base, it will be noted that a longitudinally extending bottom skid or pan 45, located centrally of the frame, has its bottom surface 46 engageable with the mine floor, this pan has laterally spaced guides 47 (Figs. 6 and 7) slidingly engaged in longitudinal guideways 48 provided by a transverse frame portion 49. Secured to the opposite sides of the main frame 5 are upright hydraulic cylinders 50 containing pistons 51 having piston rods 52 extending downwardly from the cylinders and loosely pivotally connected at 53 to armlike projections 54 projecting laterally from and integrally secured to the transverse frame portion 49. The bottom skid has mounted longitudinally thereon at 56 a centrally located, horizontal hydraulic cylinder 57 containing a piston 58 having oppositely extending piston rods 59 projecting forwardly and rearwardly from the opposite ends of the cylinder and the forward piston rod is rigidly secured at 60 to the transverse frame portion 49. By extending the piston rods in opposite directions out through the cylinder heads the piston is provided with opposed effective pressure areas which are equal. Thus, when liquid under pressure is properly supplied to the cylinder 57 and the bottom pan 45 is engaged with the mine floor with a substantial portion of the weight of the apparatus thereon, the main frame 5 and the structure carried thereby may be moved either forwardly or rearwardly along a rectilinear path relative to the then-stationary bottom pan. When the bottom pan is elevated by the fluid cylinders 50 from the mine floor and the weight of the apparatus is removed therefrom, the pan may be moved either forwardly or rearwardly along a rectilinear path relative to the then-stationary main frame. When liquid is trapped in the cylinder the parts may be locked in adjusted position.

Figure 5:
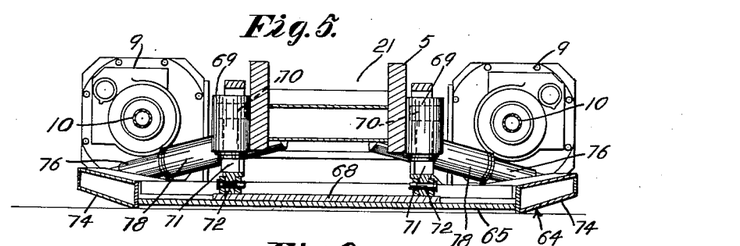
Fig. 5 is a cross section taken substantially on line 5—5 of Fig. 1, illustrating details of the front shoe structure of the creeper base.
Figure 9:
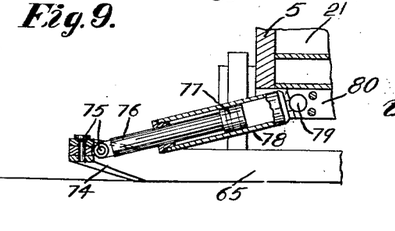
Fig. 9 is a vertical section taken on line 9—9 of Fig. 3, showing one of the swing cylinders of the creeper base.

Arranged beneath the forward portion of the main frame 5 is an adjustable shoe device 64 (Figs. 1, 2 and 5) comprising a curved floor engaging shoe 65 providing arcuate guideways 66 for receiving curved guides 67 on a curved support 68. The curved guides extend along an arc struck on a radius extending from the upright pivotal axis of the main frame. As shown in Fig. 5, vertical hydraulic cylinders 69 are secured to the opposite sides of the forward portion of the main frame, and these cylinders contain pistons 70 having piston rods 71 extending downwardly from the cylinders and pivotally connected on transverse axes at 72 to the curved support 68. Thus, the shoe 65 may be raised or lowered relative to the mine floor, and at times the shoe receives the major portion of the weight of the apparatus, as later explained. The shoe 65 has opposite, laterally extending projections 74, inclined upwardly and outwardly at their outer portions, as shown in Figs. 5 and 9, and universally pivotally connected at 75 to the outer extremities of these shoe-projections are piston rods 76 of pistons 77 contained in hydraulic cylinders 78. These cylinders are inclined upwardly and inwardly as shown and are pivotally connected at their inner adjacent ends by universal pivots 79 to a depending bracket 80 secured centrally to the bottom of the main frame 5. Thus, when liquid under pressure is properly supplied to these swing cylinders 78 and the shoe 65 is elevated by the hydraulic cylinders 69, the shoe 65 may be moved in a curved path, along a wide arc, having its radius struck from a point lying at the longitudinally median line of the main frame in coincidence with the frame pivot axis, relative to the main frame 5. When the shoe is lowered to the mine floor and receives a substantial portion of the weight of the apparatus, the main frame 5 may be swung horizontally by the cylinders 78 relative to the then-stationary shoe along an arc struck on a radius extending from the same point as the radius of arcuate movement of the shoe.

Figure 1:
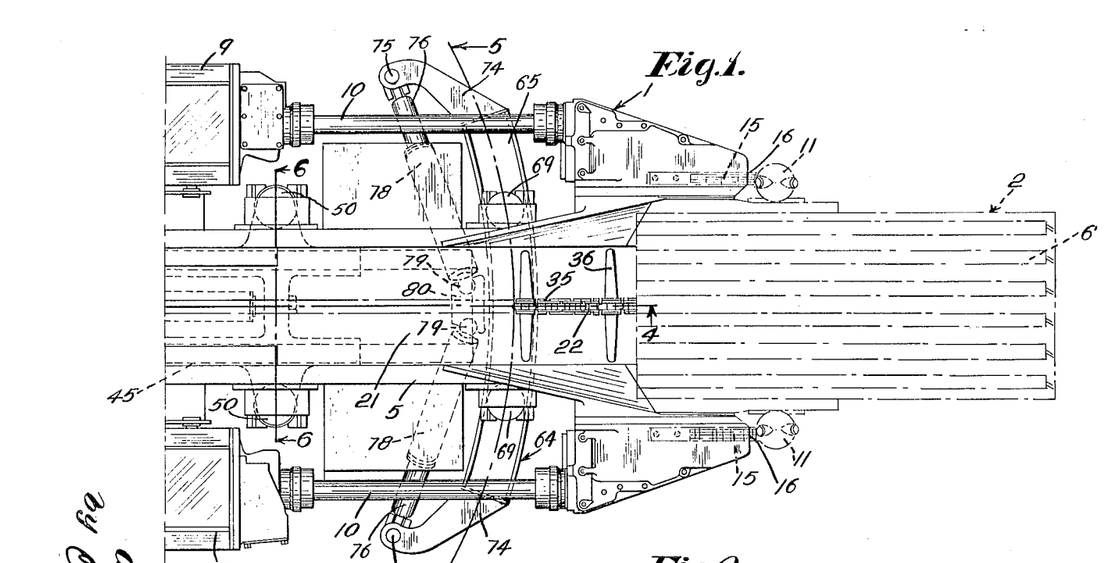
Figures 1A, 2A:
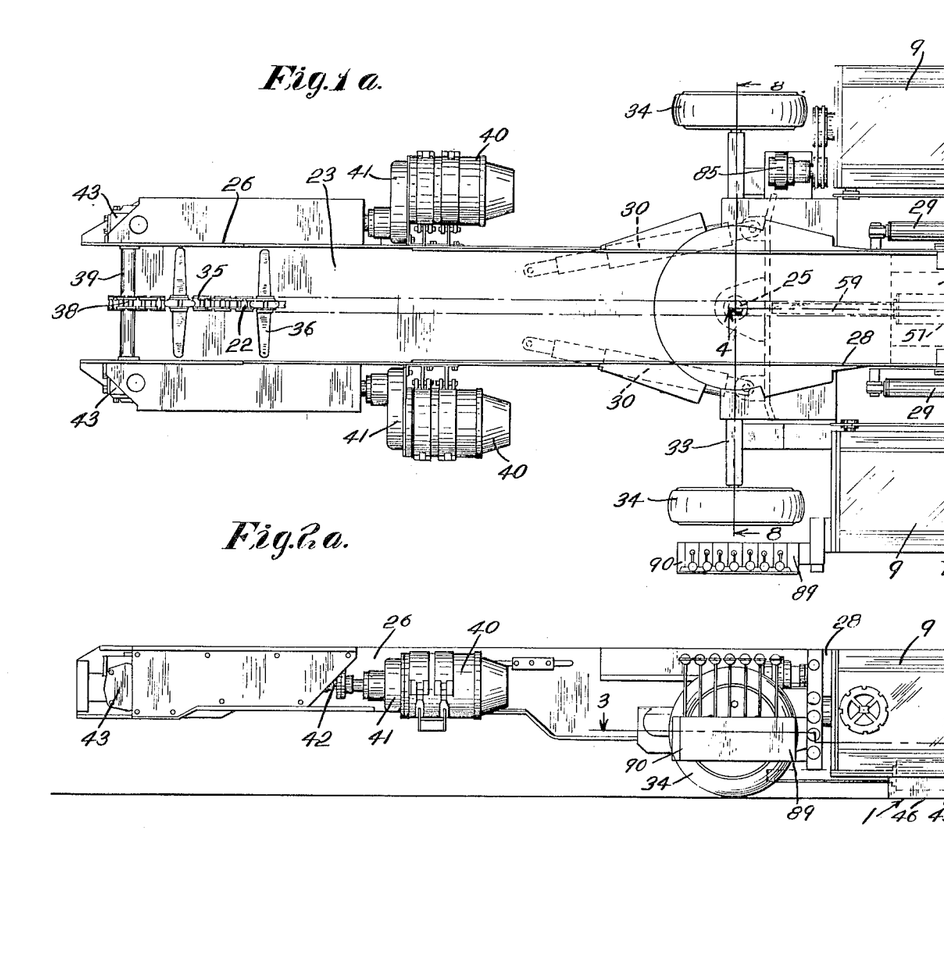
Figure 2:
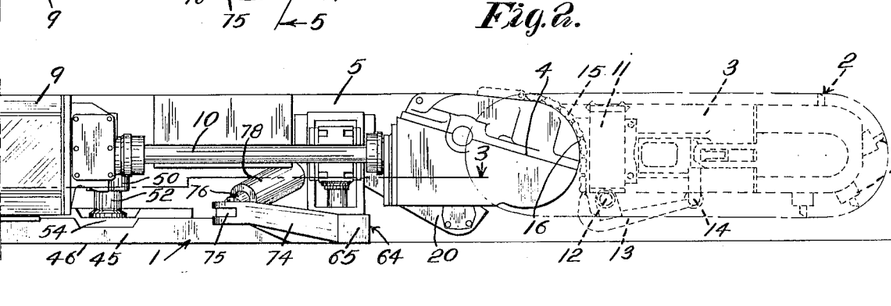
Figure 3:
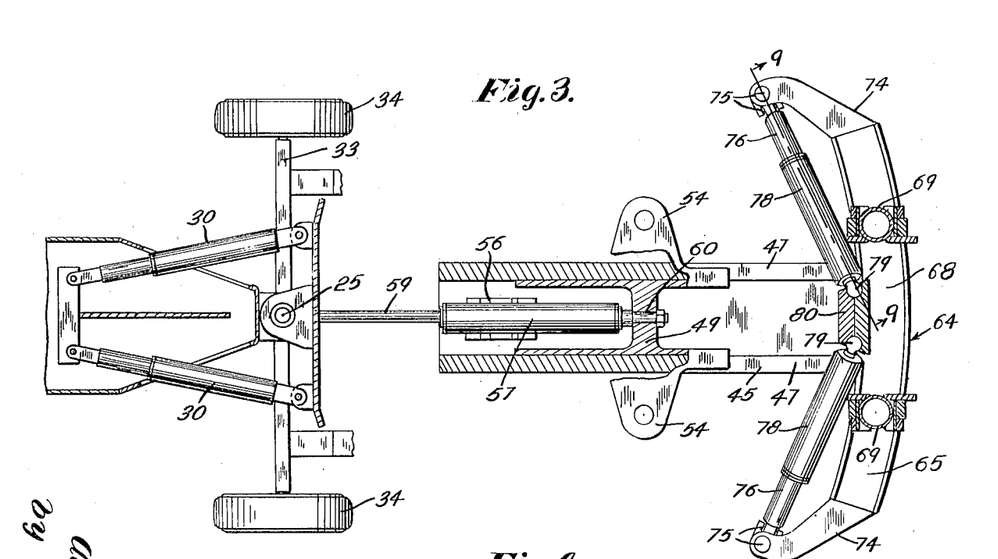
Fig. 3 is a horizontal section taken substantially on line 3—3 of Figs. 2 and 2a, with parts shown in full.
Figure 10:
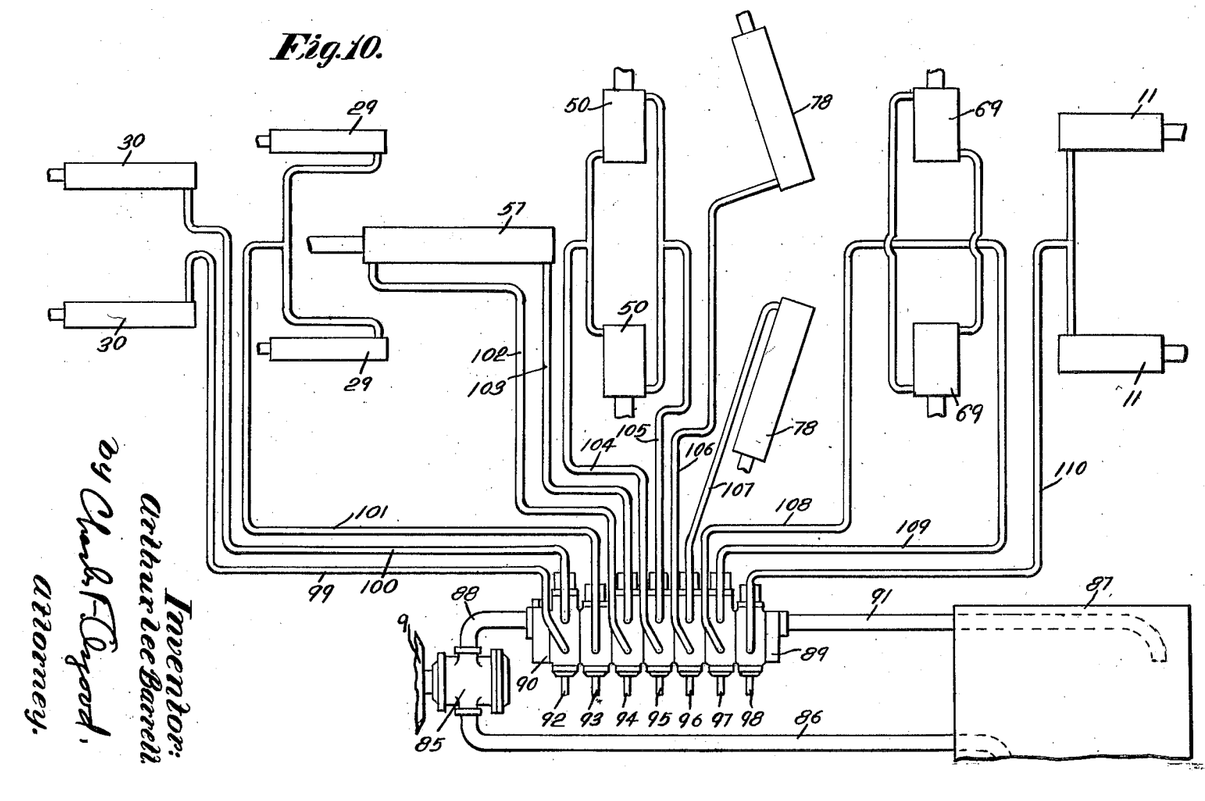
Fig. 10 is a diagrammatic view illustrating the hydraulic system of the apparatus shown in Figs. 1 to 9 inclusive.

Now referring to the hydraulic system of the apparatus above described and particularly in Fig. 10, it will be noted that a pump 85, driven by one of the motors 9, has its suction side connected by conduit 86 to a liquid tank 87, and the discharge side of the pump is connected by conduit 88 to the pressure passage of a valve box 89 of a conventional control valve mechanism 90. As shown in Figs. 1a and 2a, the pump 85 and the valve mechanism 90 are both mounted at the rear end of the main frame 5, with the valve mechanism conveniently located at one side of the frame. The exhaust passage of the valve box is connected by a return conduit 91 back to the tank. The valve box has a series of bores which respectively receive conventional slide valves of the balanced spool type, designated 92, 93, 94, 95, 96, 97 and 98, and each having a suitable operating handle. The bore containing the slide valve 92 is connected by conduits 99 and 100 to the swing jacks 30 for the rearward portion of the conveyor, and the bore containing the slide valve 93 is connected by a conduit 101 to the tilt jacks 29 for the rearward conveyor portion. The bore containing the slide valve 94 is connected by conduits 102 and 103 to the opposite ends of the feeding and retracting cylinder 57. The bore containing the slide valve 95 is connected by conduits 104 and 105 to the opposite ends of the elevating cylinders 50 for the bottom pan or skid, while the bore containing the slide valve 96 is connected by conduits 106 and 107 to the swing cylinders 78 for the floor engaging shoe, and the bore containing the slide valve 97 is connected by conduits 108 and 109 to the opposite ends of the elevating cylinders 69 for the shoe 65. The bore containing the slide valve 98 is connected by conduit 110 to the swing cylinders 11 for the dislodging and disintegrating mechanism 2.

The walking or creeping action of the base may be effected in the following manner. When the bottom pan 45 has been lowered by the cylinders 50 into contact with the mine floor and the front shoe 65 is elevated by the cylinders 69, the feed cylinder 57 may be operated to feed the main frame 5, together with the structure supported thereby, in a forward direction along a rectilinear path while the pan remains stationary. When the main frame has assumed the limit of its forward stroke, the shoe 65 may be lowered by the cylinders 69 into contact with the mine floor and the cylinders 50 may be operated to raise the pan 45, and the latter when raised may be fed forwardly by the hydraulic cylinder 57 while the main frame 5 remains stationary. When the pan has reached the limtit of its forward stroke it is again lowered down onto the mine floor and the main frame is again fed forwardly and these operations may be successively repeated to effect step-by-step advance of the apparatus. By effecting these raising, sliding and lowering functions in the reverse manner, the apparatus may be retracted. When it is desired to swing the main frame horizontally step by step, the front shoe 65 is lowered into contact with the mine floor and the pan 45 is raised, the cylinders 78 may be operated to swing the main frame together with the structure supported thereby laterally relative to the then-stationary front shoe. The pan 45 may then be lowered and the front shoe raised out of contact with the mine floor and the cylinders 78 may again be operated to shift the shoe laterally along a curved path relative to the then-stationary main frame, and these operations may be repeated to swing the main frame step by step through a relatively wide arc. Thus, the walking or creeper base may not only effect step-by-step movement of the apparatus back and forth along the mine floor but may also be operated to effect step-by-step lateral swing of the apparatus to position and steer the same as desired.

Figure 11:
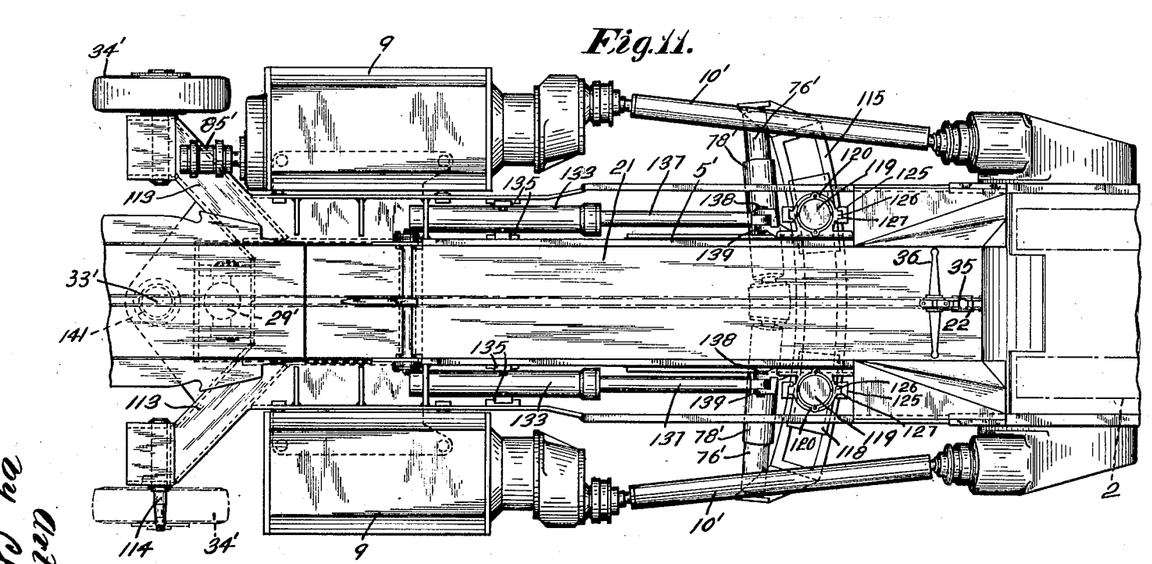
Fig. 11 is a fragmentary plan view illustrating a mining apparatus having a creeper base constructed in accordance with a modified embodiment of the invention.
Figure 12:
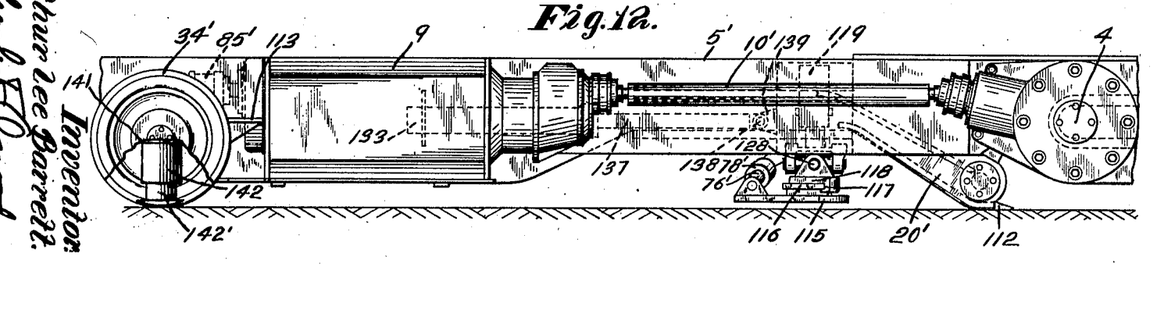
Fig. 12 is a side elevational view of the apparatus shown in Fig. 11.
Figures 13, 14, 15:
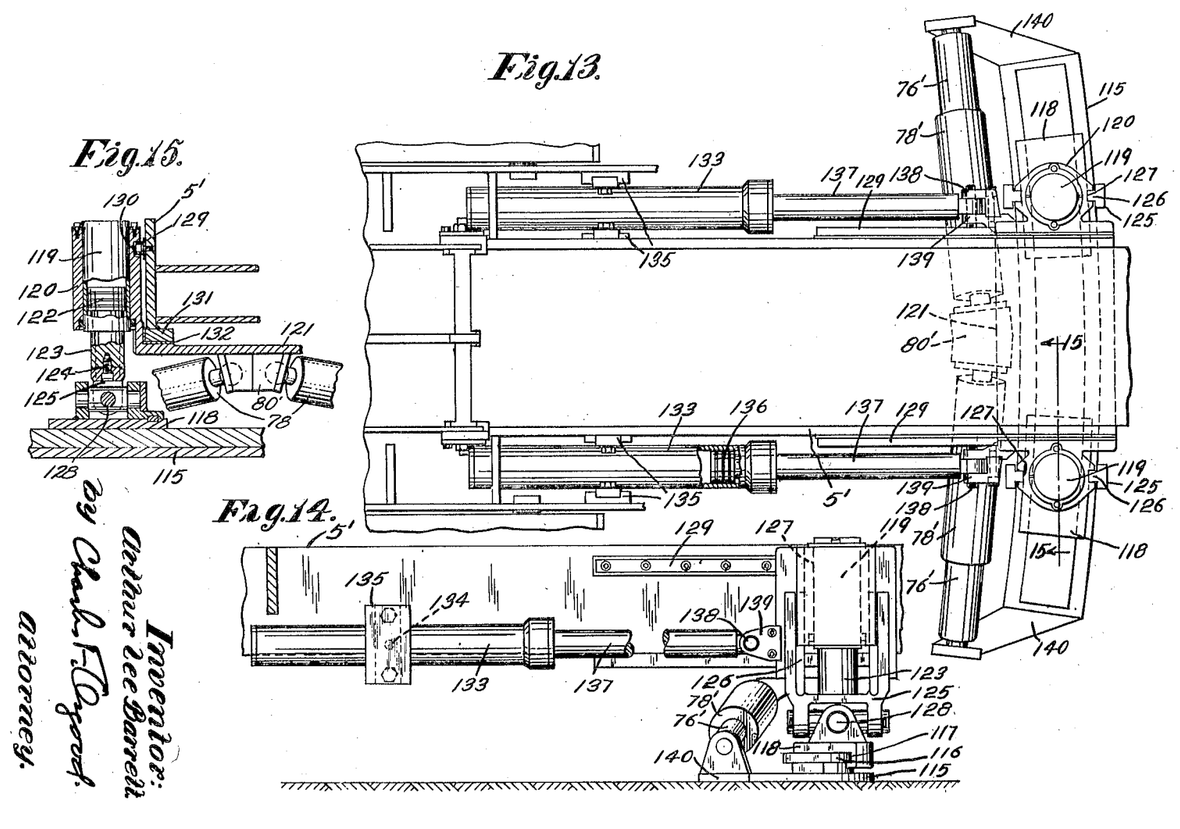
Fig. 13 is a fragmentary plan view, in some respects similar to Fig. 3, illustrating the modified cylinder arrangement of the apparatus shown in Figs. 11 and 12, for effecting forward feed and retraction.
Fig. 14 is a side elevational view of the modified structure shown in Fig. 13.
Fig. 15 is a detail vertical section taken on line 15—15 of Fig. 13.

In the modified embodiment of the invention shown in Figs. 11 to 15 inclusive, a walking base structure is shown which is generally similar to that of the embodiment above described. In this construction, however, the main frame 5' is supported at its rear end by rubber-tired wheels 34', as shown in Figs. 11 and 12, and at its forward end its downwardly inclined portion 20' is provided with a floor engaging shoe or support 112 which is integral with the main frame and which underlies the front receiving end of the conveyor. The main frame 5' is formed at its rearward end with relatively inclined outwardly diverging frame portions 113, 113 which support stub axles 114 on which the wheels are journaled. Thus, a rear wheel mounting structure quite like that of the first embodiment above described, is provided. A single centrally located upright hydraulic jack 29' (Fig. 11) is arranged between the tiltable discharge portion of the conveyor and the rearward portion of the main frame, for elevating the discharge end of the conveyor. The dislodging and disintegrating mechanism 2 is pivotally mounted on the forward portion of the main frame to swing in a vertical plane in the manner of the embodiment first described, and, in a similar manner, is driven by motors 9 mounted at the opposite sides of the main frame just in advance of the rear wheels and these motors are connected through universal drive shafts 10' to the dislodging and disintegrating mechanism for effecting orbital circulation of the disintegrating chains. Arranged rearwardly of the floor engaging shoe 112 on the main frame is an adjustable front shoe structure, which is likewise similar to that of the embodiment first described, and this shoe structure comprises a curved front floor engaging shoe 115 having a forward arcuate guide 116 engaging a curved guideway 117 on a support 117. Arranged at the opposite sides of the main frame 5' of the apparatus are vertical hydraulic cylinders 119 contained in vertical bores (see Fig. 15) in brackets 120 which are rigidly connected by a cross frame 121 which extends transversely beneath the forward portion of the main frame rigidly to hold the cylinders in spaced relation. Contained in the cylinders 119 are pistons 122 having piston rods 123 extending downwardly from the cylinders and rigidly secured at 124 to upright guide members 125. These guide members are provided with vertical guides 126 slidingly received in vertical guideways 127 at the sides of the brackets 120. The guide members 125 have universal pivotal connection at 128 with the support 118. Arranged at opposite sides of the forward portion of the main frame are longitudinal guides 129 which are received in longitudinal guideways 130 formed on the inner walls of the brackets 120. The lower side portions 131 of the sliding frame slidingly engage longitudinal guiding surfaces 132 on the lower portions of the brackets. Hydraulic cylinders 133 extend longitudinally along the outer sides of the main frame and are pivotally mounted intermediate their ends at 134 on brackets 135 projecting from the sides of the main frame. These cylinders contain pistons 136 having piston rods 137 extending forwardly from the cylinders and pivotally connected at 138 to brackets 139 secured to the brackets 120. When the main frame is supported by the shoe 112 and the shoe 115 is elevated by the cylinders 119 the cylinders 133 may be operated to move the brackets 120 back and forth along their guideways on the main frame, and when the shoe 115 is lowered into contact with the mine floor with the shoe 112 elevated and has received a substantial portion of the weight of the apparatus, the cylinders 133 may be operated to move the main frame longitudinally back and forth relative to the then-stationary shoe and the cross frame 121. The shoe 115 has lateral portions 140 and swing cylinders 78', similar to those of the embodiment above described, are arranged between the extremities of these lateral portions and a centrally located bracket 80' secured to the bottom of the cross frame 121, and are operative either to move the shoe 115 laterally along an arcuate path relative to the main frame or to swing the main frame relative to the stationary shoe, depending on whether the shoe is held against the floor or is raised up from the floor.

In lieu of the pair of rear supporting wheels, other types of supporting means may be provided such as a free moving crawler base or a floor engaging skid. A hydraulic jack generally designated 141 may be provided at the rear pivot for the horizontal swingable frame of the apparatus, as shown in dotted and full lines in Figs. 11 and 12 respectively. During horizontal swing of the apparatus, this jack may be lowered into contact with the mine floor to insure proper centering of the pivot during such horizontal swing. This jack may have a cylinder 142 secured to the main frame of the apparatus in coaxial relation with the pivot 33' (Fig. 11) and containing a piston provided with a plunger-like piston rod 142' which is engageable with the floor. The jack 141 may be omitted if desired since the pair of rear wheels disclosed serve, under most conditions, as an adequate rear support as the main frame is swung horizontally during positioning of the dislodging and disintegrating mechanism.

Figure 16:
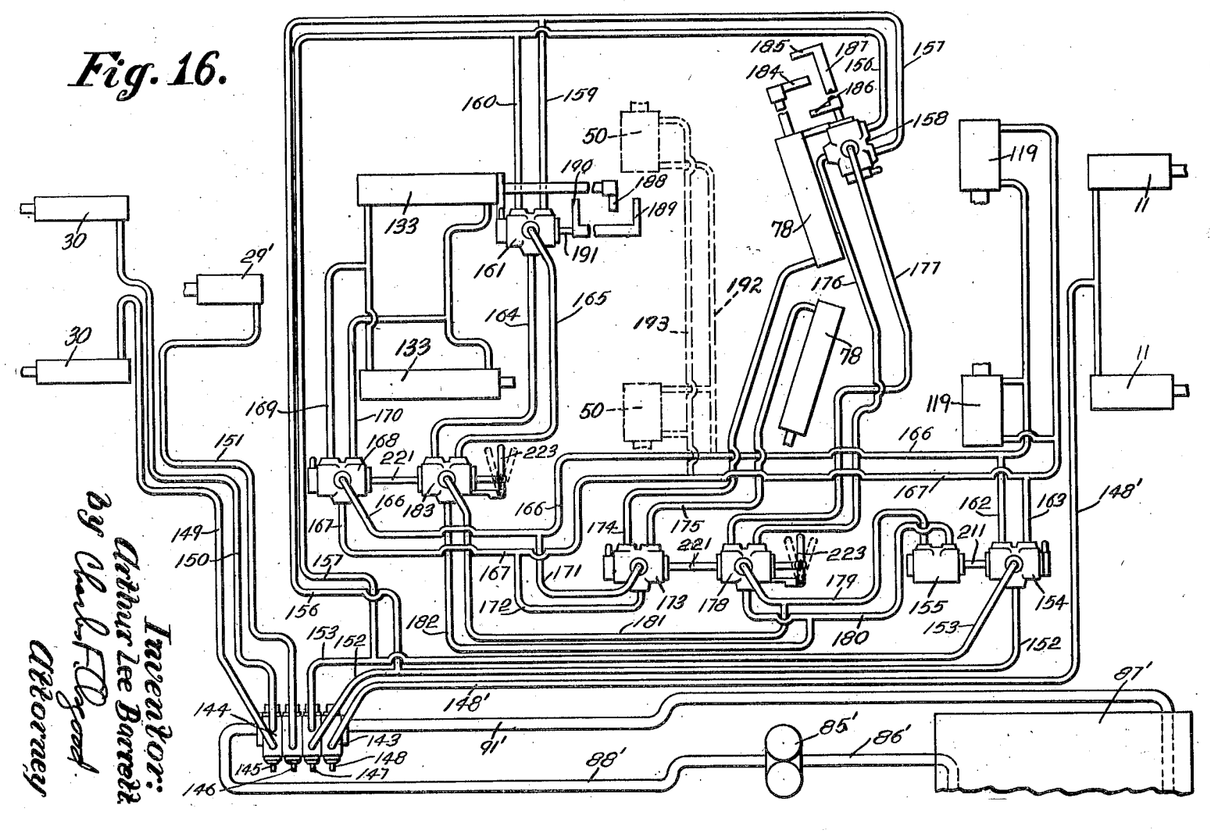
Fig. 16 is a diagrammatic view illustrating a modified hydraulic system used with the apparatus disclosed in Figs. 11 to 15 inclusive.

In the modified hydraulic system shown diagrammatically in Fig. 16, a pump 85' driven by one of the motors 9 for the dislodging and disintegrating mechanism 2, has its suction side connected by conduit 86' to a liquid tank 87', and the discharge side of the pump is connected by conduit 88' to the pressure passage of a valve box 143 of a conventional control valve mechanism 144. The discharge passage of the valve box is connected by conduit 91' back to the tank. The valve box has bores containing conventional slide valves of the balanced spool type designated 145, 146, 147 and 148, each having a suitable operating handle. The bore containing the slide valve 145 is connected by conduits 149 and 150 to the swing jacks 30 for the rearward portion of the conveyor, while the bore containing the slide valve 146 is connected by a conduit 151 to the conveyor tilt jack 29'. The bore containing the slide valve 148 is connected by conduit 148' to the swing cylinders 11 for the dislodging and disintegrating mechanism 2. The bore containing the slide valve 147 is connected by supply and exhaust conduits 152 and 153 respectively to a control device valve device 154 which is actuated by a hydraulic servomotor 155. Branch supply and exhaust conduits 156 and 157 lead from the conduits 152 and 153 respectively to an automatic control valve device 158 mounted on one of the swing cylinders 78 and similar branch supply and exhaust conduit 159 and 160 lead from the conduits 156 and 157 respectively to an automatic control valve device 161 mounted on one of the feed cylinders 133. Conduits 162 and 163 lead from the servomotor-actuated control device 154 to the opposite ends of the elevating cylinders 119 for the floor engaging shoe 115. Conduits 164 and 165 lead from the automatic control device 161, as later mentioned. Conduits 166 and 167 lead from the conduits 162 and 163 respectively to a manually operable control valve device 168 and conduits 169 and 170 connect the device 168 to the opposite ends of the sumping and retracting cylinders 133. Branch conduits 171 and 172 lead from the conduits 166 and 167 respectively to a manually operable control valve device 173 which is in turn connected by conduits 174 and 175 to the swing cylinders 78 respectively. The automatic swing control valve device 158 is connected by conduits 176 and 177 to a manually operable control valve device 178 which is in turn connected by conduits 179 and 180 to the opposite ends of the servomotor 155. Branch conduits 181 and 182 lead from the conduits 179 and 180 respectively to a manually operable control valve device 183, and the conduits 164 and 165 are connected to the latter. The piston rod of the swing cylinder 78 on which the automatic valve 158 is mounted has a projection 184 secured thereto and this projection is engageable with spaced projections 185 and 186 of a shifter member 187 for the automatic control valve device 158. The piston rod of the feed cylinder 133 on which the automatic valve 161 is mounted has a similar projection 188 engageable with spaced projections 189 and 190 on a shifter member 191 for the automatic control valve device 161. Thus, either movement of the piston rods or the cylinders may effect actuation of the shifter members 187 and 191, to shift the valve elements of the automatic valves, as hereinafter described.

In the event an automatic control of the movements of the creeper base of the embodiment shown in Figs. 1 to 10 inclusive is desired, the control of the elevating jacks 50 for the bottom pan 45 would be effected by branch conduits 192 and 193 leading from the conduits 166 and 167, respectively, to the jack cylinders as shown in construction lines in Fig. 16. Thus, the jacks 50 would be operated automatically in the interim between times of operation of the skid elevating cylinders 119 and the feeding and retracting cylinder 57 in a manner which is self-evident. Of course, if the adjustable bottom pan 45 were provided in the structure of Figs. 11 to 15 inclusive, the front skid 112 would be omitted and the apparatus would, in the major part, be supported either by the bottom pan or the front shoe in the manner described above in connection with the embodiment first described.

Figures 17, 18, 19:
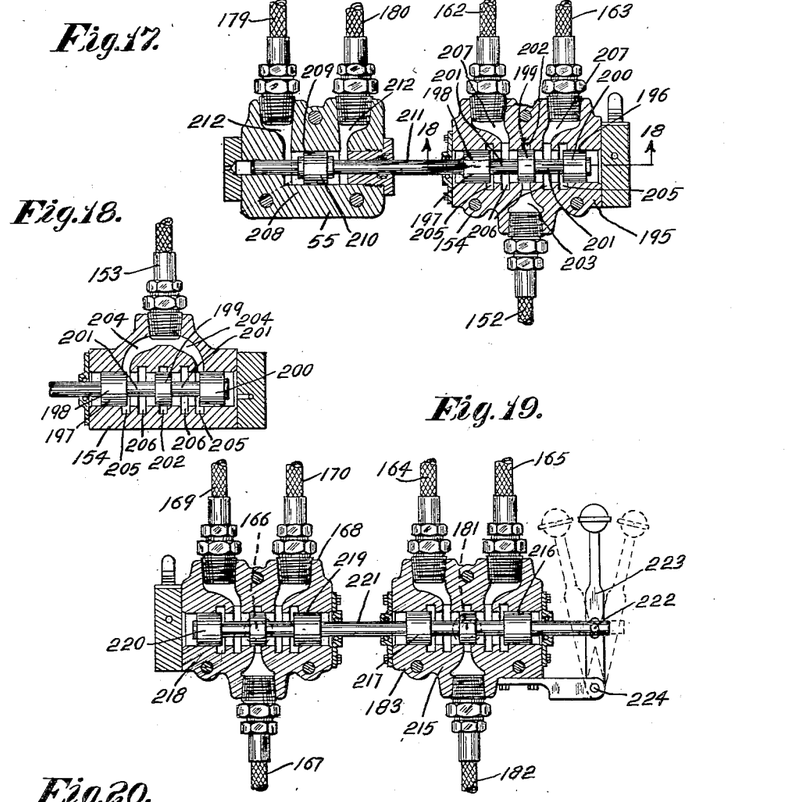
Fig. 17 is an enlarged longitudinal section taken through the servomotor actuated valve device shown in Fig. 16.
Fig. 18 is a detail section taken on line 18—18 of Fig. 17.
Fig. 19 is an enlarged longitudinal section through one of the hand operated control valves of Fig. 16.
Figure 20:
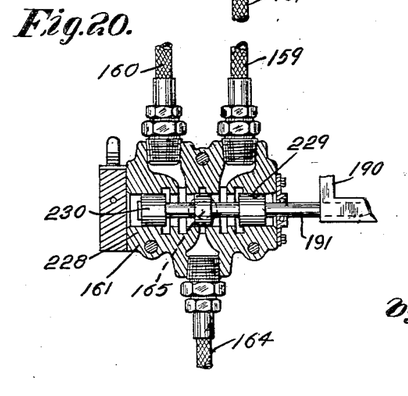
Fig. 20 is an enlarged longitudinal section taken through one of the automatically actuated valves of Fig. 16.

As disclosed in Fig. 17, the servomotor actuated control valve device 154 comprises a valve casing 195 having a bore 196 in which a spool valve 197 is slidingly guided. This spool valve has three axially spaced spools 198, 199 and 200 separated by reduced portions 201 to provide annular spaces between the spools. Formed in the wall of the valve receiving bore 196 midway between its ends is an annular groove 202 with which the supply conduit 152 communicates through a passage 203. As shown in Fig. 18, the exhaust conduit 153 communicates through branch passages 204 with annular grooves 205 formed in the wall of the valve receiving bore at points spaced equidistantly from and at opposite sides of the centrally located groove 202. Formed in the wall of the valve receiving bore and located between the centrally located groove 202 and the grooves 205 are annular grooves 206 which communicate through passages 207 with the conduits 162 and 163 respectively. The servomotor 155 (Fig. 17) comprises a cylinder 208 having a bore 209 in which a piston 210 is reciprocably mounted, and the valve 197 has its stem 211 secured to this piston. Conduits 179 and 180 are connected through passages 212 to the opposite ends of the cylinder bore at the opposite sides of the piston. Thus, when liquid under pressure is supplied through one of the conduits 179, 180 and the other conduit is connected to exhaust, the piston 210 of the servomotor may be moved in one direction or the other thereby to shift the valve 197 in one direction or the other. When the valve 197 is in its extreme right-hand position, as viewed in Fig. 17, the conduit 163 is connected to the exhaust conduit 153 while the conduit 162 is connected to the supply conduit 152 and when the valve is shifted to its left-hand position, as viewed in Fig. 17, the conduit 162 is connected to the exhaust conduit 153 while the conduit 163 is connected to the supply conduit 152. The pair of control valve devices 168 and 183 are similar to the valve devices 173 and 178 and a description of one pair will suffice for both pairs. The valve device 183 comprises a valve casing 215 having a bore 216 slidingly receiving a spool valve 217. A similar casing 218 has contained in its bore 219 a slidable spool valve 220, and this latter valve is connected to the valve 217 by a valve stem 221. The oppositely projecting end of the valve stem is pivotally connected at 222 to a hand lever 223 in turn pivoted at 224 on a bracket secured to the valve casing 215 and the valves 217 and 220 may be shifted in unison by means of this hand lever. The spool valves and the passages and grooves in the valve casings 215 and 218 are similar to those described above in connection with the control device 154, with the conduit 182 communicating wtih a central groove in the wall of the valve receiving bore, the conduit 181 communicating with end grooves in the bore walls, and the conduits 164 and 165 communicating with intermediate grooves. Also, the conduit 167 communicates with a central groove in the valve receiving bore of the casing of the valve device 168, the conduit 166 communicates with the end grooves, and the conduits 169 and 170 communicate with the intermediate grooves in the bore walls. The conduits 166 and 181 are connected with the end grooves in the same manner as the conduit 153, shown in Fig. 18. The automatic control valve 161, shown in Fig. 20, and the automatic control valve 158 are identical in design and a description of one will suffice for both. The automatic control valve device 161 comprises a casing 228 suitably secured to the adjacent cylinder 133 and having a bore 229 containing a reciprocable slide valve 230 similar to the valves above described. The conduit 164 communicates with a central groove in the wall of the valve receiving bore, the conduit 165 communicates with the end grooves, and the conduits 160 and 159 communicate with the intermediate grooves. The shifter member 191 is secured to the stem of the valve in the manner shown.

When it is desired to effect automatic, step-by-step forward feeding of the apparatus over the mine floor, the manually operable valve devices 168 and 183 are shifted, to connect the supply conduit 167 with the forward feed conduit 170 and to connect conduits 159 and 165 to the conduit 182, and liquid under pressure may then flow through conduits 152, 156 and 159, past the valve of the automatic valve device 161, through conduit 165, past the valve of the valve device 183, and through conduits 182 and 180 to the right-hand end of the cylinder bore 209 of the servomotor thereby to move the servomotor piston 210 to the left in Fig. 17, to shift the spool valve 197. When the spool valve 197 is positioned at the left in Fig. 17, liquid under pressure may flow from conduit 152 to the conduit 163 which is connected to the upper ends of the cylinders 119 of the elevating jacks for the shoe 115 thereby to lower the latter into contact with the mine floor and to tilt the main frame to elevate the shoe 112 so that a substantial portion of the weight of the main frame is received by the shoe 115. When the elevating jacks reach the limit of their downward travel, liquid pressure builds up in the conduits 167 and 170 to effect forward feed of the main frame together with the structure supported thereby in a forward direction relative to the then-stationary shoe 115, and when the limit of forward feed is approached the valve of the automatic valve device 161 is automatically shifted to reverse the connection of the conduits 164 and 165 with the conduits 160 and 159 so that liquid under pressure may then flow through conduits 165, 181 and 179 to the left-hand end of the cylinder bore 209 of the servomotor to move the servomotor piston 210 to the right to locate the spool valve 197 in its right-hand position in Fig. 17. The liquid in the upper ends of the jack cylinders 119 is then connected to exhaust through conduits 163 and 153, and liquid under pressure may flow through conduit 152 and 162 to the lower ends of the jack cylinders 119 to raise the jack pistons to effect elevation of the shoe 115 causing the machine frame to tilt downwardly to bring the floor engaging shoe 112 back onto the floor thereby to shift the larger portion of the weight of the frame from the shoe 115 back onto the floor engaging shoe 112. When the jacks reach their limit of upward travel with the shoe 115 elevated, liquid under pressure builds up in the conduits 166 and 169 to effect forward movement of the feed pistons 136 thereby to move the shoe 115 forwardly along its guideways back to its initial position with respect to the main frame while the latter remains stationary. The automatic opposite shifting of the servomotor actuated valve device 154 continues as long as the valve device 183 remains properly positioned, to effect step-by-step forward movement of the apparatus over the mine floor. When the valve devices 168 and 183 are manually shifted to their reversed positions the events above described occur in reverse order, thereby automatically to effect step-by-step reverse movement of the apparatus over the mine floor. To interrupt step-by-step longitudinal movement of the apparatus the valve devices 168 and 183 are manually shifted into their neutral positions.

When it is desired to effect automatic step-by-step lateral swinging movement of the apparatus, the valve devices 173 and 178 are manually shifted to effect supply of liquid under pressure to and the exhaust of liquid from the desired one of the swing cylinders 78, depending upon the desired direction of swing. When a left turn is to be effected the valve devices 173 and 178 are shifted to the left in Fig. 16 and liquid under pressure may then flow from conduit 152 through conduits 156 and 157, past the valve of the automatic valve device 158 through conduit 176, past the valve of the valve device 178 and through conduit 180 to the right-hand end of the cylinder 208 of the servomotor to shift the valve of the control device 154 to the left in Fig. 17. Liquid under pressure may then flow through conduit 163 to the upper ends of the jack cylinders 119 to lower the shoe 115 into engagement with the floor and to tilt the main frame upwardly to raise the shoe 112 from the floor, thereby to transfer a substantial portion of the weight of the main frame to the shoe 115. When the elevating jacks reach their limit of downward travel, the pressure builds up in the conduits 167, 172 and 175 leading to one of the swing cylinders 78 thereby to effect swinging of the main frame horizontally to the left about its upright, rearwardly located axis. When the swing cylinder approaches its limit of travel the automatic valve device 158 has moved into a position wherein its valve is automatically shifted by the shifter 187 to reverse the position of the valve. When the automatic valve is shifted, liquid under pressure may flow through conduit 177, past the valve of the control device 178 and through conduit 179 to the left-hand end of the cylinder 208 of the servomotor to move the piston 210 to the right in Fig. 17, thereby to shift the valve of the control device 154 into its right-hand position. Liquid under pressure may then flow from conduit 152 to the conduit 162 to the lower ends of the jack cylinders to move the jack pistons upwardly to lower the shoe 112 back onto the floor and thereafter to elevate the shoe 115 from the floor. When the elevating jacks reach their limits of upward travel the pressure of the liquid in conduits 166, 171 and 174 flowing to the other swing cylinder 78 builds up to effect movement of the bottom shoe 115 arcuately along the path struck on a radius extending from the axis of the frame pivot relative to the then-stationary main frame. The automatic valve device 158 is then again tripped and the shoe 115 is again lowered to receive a substantial portion of the weight of the main frame and thereafter the main frame is swung horizontally and these operations are repeated in a definite sequence to move the apparatus to the desired lateral position. When the swing of the apparatus in the opposite direction, i. e. to the right, is desired, the valve devices 173 and 178 are manually shifted to their right-hand position in Fig. 16 and the above sequence of events is repeated in reverse order to swing the main frame step by step to the right. It will be noted that the range of swing of the swing cylinders 78 may be exactly that necessary to laterally reposition the dislodging and disintegrating mechanism 2 between its series of adjacent sumping, swinging and retracting operations, and during the cutting and dislodging operation the dislodging and disintegrating mechanism is successively moved through its series of dislodging and disintegrating positions from one side of the face to the other.

Figure 21:
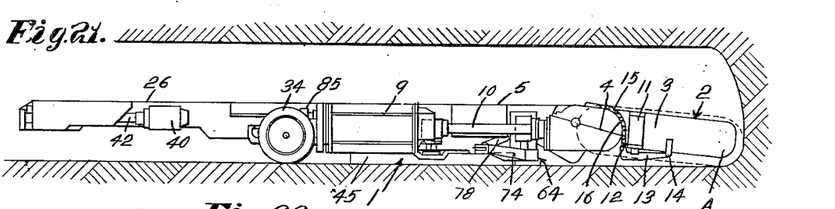
Figs. 21, 22 and 23 are schematic side views illustrating different operating positions of the continuous mining apparatus in an underground mine.
Figure 22:
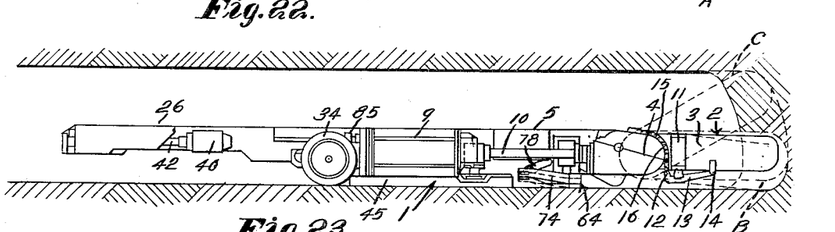
Figure 23:
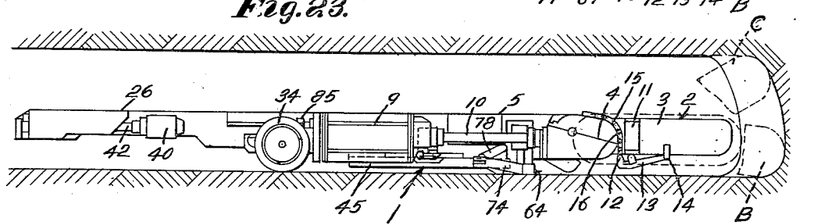
Figure 24:
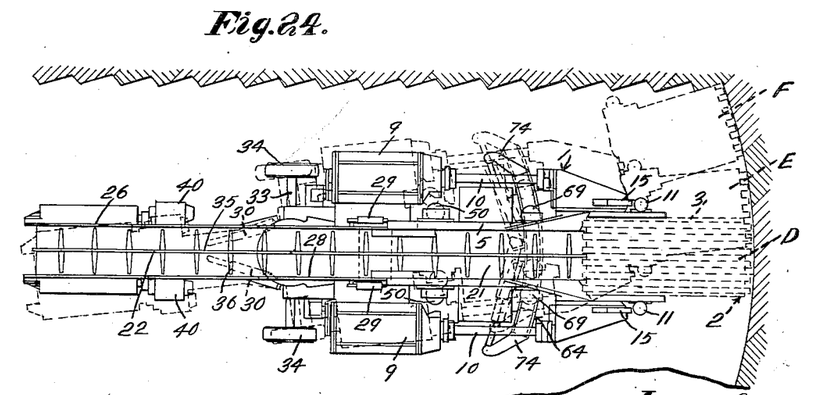
Fig. 24 is a similar schematic plan view showing other operating positions of the mining apparatus.

The general mode of operation of the improved continuous mining apparatus is as follows: In both embodiments of the invention above described, the apparatus may be trammed step by step about the mine by the creeper base and the base may be operated to turn the apparatus either to the right or left to effect steering of the apparatus as it travels through the sharply curved and relatively restricted passageways of an underground mine. When the working face is reached, with the apparatus positioned as shown in Fig. 23, the main frame of the apparatus may be swung laterally by the creeper base to locate the dislodging and disintegrating mechanism 2 near one rib and the dislodging and disintegrating mechanism may be swung downwardly by discharging liquid from the swing cylinders 11 under the control of the slide valve 148, until its outer tip end assumes a position near the floor level as shown at A in Fig. 21. The apparatus may then be moved forwardly by the creeper base to sump the outer portion of the dislodging and disintegrating mechanism into the mine vein, to the position indicated at B in Fig. 22. After the dislodging and disintegrating mechanism 2 has been sumped into the mine vein, liquid under pressure may be supplied to the swing cylinders 11 under the control of the slide valve 148 to swing the dislodging and disintegrating mechanism upwardly along an arcuate path until its outer tip end reaches the roof level as indicated by dotted lines at C in Fig. 22 and thereafter the apparatus may be retracted by the creeper base to withdraw the dislodging and disintegrating mechanism from the mine vein. In the diagrammatic plan view of Fig. 24 different, radially located, lateral positions of the dislodging and disintegrating mechanism 2 are shown at D, E and F, and upon the completion of each sumping, swing and withdrawal operation of the dislodging and disintegrating mechanism the apparatus is laterally positioned by the creeper base and such operations are repeated so that the entire face of the mine vein is dislodged. Since the general mode of operation of a continuous mining apparatus of the character disclosed is fully described in the copending Russell and Sibley applications above referred to, further description thereof is herein unnecessary.

As a result of this invention an improved continuous mining apparatus is provided which is capable of operating in underground mines having extremely low headroom. By the provision of the novel creeper base of the apparatus, the latter may be moved step by step either forwardly or rearwardly over the floor of the mine and may be swung horizontally step by step by the creeper base to steer the apparatus and to adjust the dislodging and disintegrating mechanism of the apparatus into its different lateral operating positions. The provision of the improved creeper base structure enables the reduction in height of the apparatus to a minimum, while still retaining flexibility in control and operation. The novel creeper base structure is not only capable of a wide range of adjustment and flexible in operation but is also of a simple and rugged construction, well adapted for its intended purpose. These and other advantages of the invention will be clearly apparent to those skilled in the art.

While there are in this application specifically described several forms and modifications which the invention may assume in practice, it will be understood that these forms and modifications of the same are shown for purposes of illustration and that the invention may be further modified and embodied in various other forms without departing from its spirit or the scope of the appended claims.

What I claim as new and desire to secure by Letters Patent is:

1. In an apparatus of the character disclosed, a frame, and a creeper base for supporting said frame for step by step movement either forwardly or rearwardly over the mine floor and for swinging said frame step by step horizontally about an upright axis located at the rear end of the apparatus including a floor engaging support, power operated means connected between an element of said frame and said support for moving said frame longitudinally relative to said support while the latter is in frame supporting engagement with the floor, power operated means for elevating said support relative to said frame to move said support out of supporting engagement with the floor, a second floor engaging support for supporting said frame when said first mentioned support is out of supporting engagement with the floor, said first mentioned power operated means operable to move said first support longitudinally relative to said frame while a substantial portion of the weight of the latter is received by said second support, and power operated means connected between said frame and said first support for swinging said frame horizontally about said upright axis relative to said first mentioned support while the latter is in frame-supporting engagement with the floor, and said last mentioned power operated means being operable to move said first mentioned support horizontally along an arcuate path struck on a radius extending from said upright axis to reposition said first support relative to said frame while the latter is largely supported by said second mentioned support and said first mentioned support is out of supporting engagement with the floor.

2. In an apparatus of the character disclosed, a frame, and a creeper base for moving said frame step by step in a longitudinal direction and for swinging said frame step by step laterally about an upright axis located at the rear end of the apparatus including a floor engaging support, power operated means for elevating said support and for moving said support downwardly relative to said frame into engagement with the floor, and power operated means connected between said frame and said support for swinging said frame horizontally relative to said support when the latter is in frame supporting engagement with the floor and for moving said support arcuately along a path struck on a radius extending from said upright axis to reposition said support relative to said frame when said support is elevated, and means for supporting said frame when said support is elevated.

3. In an apparatus of the character disclosed, a frame, and a creeper base for moving said frame step by step in a longitudinal direction and for swinging said frame step by step laterally about an upright axis located at the rear end of the apparatus including a floor engaging support, power operated means for elevating said support and for moving said support downwardly relative to said frame into engagement with the mine floor, power operated means connected between said frame and said support for swinging said frame horizontally relative to said support when the latter is in frame supporting engagement with the floor and, conversely, for moving said support arcuately along a path struck on a radius extending from said axis of horizontal swing to reposition said support relative to said frame when said support is elevated, means for supporting said frame when said support is elevated, and power operated means connected between said frame and said supporting means for moving said frame longitudinally when said supporting means is in frame supporting engagement with the mine floor and, conversely, for moving said supporting means longitudinally relative to said frame when the latter is supported by said support and said supporting means is elevated.

4. In an apparatus of the character disclosed, a frame, supporting means for said frame for supporting the latter for movement over a floor surface including a support engageable with the floor and having an arcuate guide, a cooperating member having an arcuate guide element engaging said arcuate guide, a power device connected between said frame and said support for swinging said frame horizontally, for moving said cooperating member in an arcuate path relative to said support and for moving said guide element along said arcuate guide, a second support for said frame for receiving at least a major portion of the weight of said frame from said first support, and said power device operable to move said arcuate guide of said first support along a correspondingly curved path relative to the guide element of said cooperating member while said frame is at least largely supported by said second mentioned support.

5. In an apparatus of the character disclosed, a frame, and a creeper base for supporting said frame for movement over a floor surface and for horizontally swinging said frame including a front floor engaging shoe having an arcuate guide portion, a member connected to said shoe and having an arcuate guiding element engaging said guide portion, power devices for elevating said member relative to said frame to raise said shoe above the floor surface, means for supporting said frame when said shoe is raised, and power devices connected between said frame and said shoe for swinging said member and said frame horizontally relative to said shoe when the latter is in frame-supporting engagement with the floor and, conversely, for moving said shoe arcuately along its guide portion relative to said guiding element when said shoe is raised.

6. In an apparatus of the character disclosed, a frame, but a single bottom pan engageable with the floor, power devices for elevating said pan relative to said frame to raise said pan from the floor, front and rear floor engaging supports for receiving the weight of said frame when said pan is elevated, said pan located longitudinally of said frame intermediate said front and rear supports, power means for elevating said front support when said frame is supported by said pan and said rear support, and power means between said frame and said pan for moving said frame longitudinally relative to said pan when said frame is supported by said pan and said rear support and for shifting said pan longitudinally relative to said frame when the latter is supported by said front and rear supports.

7. In an apparatus of the character disclosed, a frame, a bottom pan engageable with the floor, power means for elevating said pan relative to said frame to raise said pan from the floor, a front shoe for receiving the weight of said frame when said pan is elevated, power means for elevating said shoe when said frame is supported by said pan, power means between said frame and said pan for moving said frame longitudinally relative to said pan when said frame is supported by said pan and for shifting said pan longitudinally relative to said frame when the latter is supported by said shoe, and power means connected between said shoe and said frame for swinging said frame arcuately relative to said shoe when said frame is supported by said shoe and for moving said shoe arcuately along a corresponding path relative to said frame when the latter is supported by said pan.

8. In an apparatus of the character disclosed, a frame, a frame-supporting means engaging a floor surface for supporting the rear end of said frame, a floor engaging shoe for supporting the front end of said frame, an arcuate floor engaging shoe arranged on said frame between said rear supporting means and said front shoe, a member connected to said arcuate shoe and having an arcuate guide engaging said arcuate shoe, power means connected between said frame and said member for moving said arcuate shoe into engagement with the floor and for thereafter tilting said frame to move said front shoe upwardly from the floor, and power means connected between said frame and said arcuate shoe for moving said member arcuately relative to said arcuate shoe to swing said frame horizontally, said last mentioned power means including a movable power element engaging an element tiltable with said frame relative to said member, said last mentioned power means operative to move said arcuate shoe along a corresponding arcuate path relative to said member while said arcuate shoe is elevated and said frame is supported by said front shoe, and said first mentioned power means operable to lower said frame to bring said front shoe into engagement with the floor and to thereafter elevate said member to raise said arcuate shoe.

9. In an apparatus of the character disclosed, a frame providing a longitudinal guideway, a support for the rear end of said frame, a support for the front end of said frame, a floor engaging shoe device mounted on said guideway to move longitudinally therealong and including a shoe engageable with the floor, power means for moving said shoe device along said guideway while said frame is supported by said front and rear supports and when said shoe is raised, and power means for lowering said shoe into engagement with the floor and for thereafter tilting said frame relative to its rear support to elevate said front support from the floor, thereby to transfer the weight of said frame from said front support to said shoe, and said first mentioned power means operative to move said frame longitudinally relative to said shoe when the latter is in its frame-supporting position in engagement with the floor.

10. In an apparatus of the character disclosed, a frame providing a longitudinal guideway, a support for the rear end of said frame, a support for the front end of said frame, a floor engaging shoe device mounted on said guideway to move longitudinally therealong and including a shoe engageable with the floor, power means for moving said shoe device along said guideway while said frame is supported by said front and rear supports and said shoe device is raised, power means for lowering said shoe into engagement with the floor and for thereafter tilting said frame relative to its rear support to elevate said front support from the floor, thereby to transfer the weight of said frame from said front support to said shoe, said first mentioned power means operative to move said frame longitudinally relative to said shoe when the latter is in its frame-supporting position, and power means connected between said frame and said shoe for swinging said frame horizontally relative to said shoe while the forward end of said frame is supported by said shoe.

11. In an apparatus of the character disclosed, a frame providing a longitudinal guideway, a support for the rear end of said frame, a support for the front end of said frame, a floor engaging shoe device mounted on said guideway to move longitudinally therealong and including a shoe engageable with the floor, power means for moving said shoe device along said guideway while said frame is supported by said front and rear supports and said shoe device is raised, power means for lowering said shoe into engagement with the floor and for thereafter tilting said frame relative to its rear support to elevate said front support from the floor, thereby to transfer the weight of said frame from said front support to said shoe, said first mentioned power means operative to move said frame longitudinally relative to said shoe when the latter is in its frame-supporting position, and power means connected between said frame and said front support for swinging said frame horizontally relative to said shoe while the forward end of said frame is supported by said shoe, and said second mentioned power means operable to elevate said shoe while said frame is supported by said front support, and said third mentioned power means being operable to move said front support arcuately relative to said frame when said front support is elevated from the floor.

12. In an apparatus of the character disclosed, an elongated frame, supporting wheels for the rear end of said frame, floor engaging supporting means for the front end of said frame, an intermediate floor engaging support carried by said frame, power means connected to said frame and to said intermediate support for transferring a portion of the weight of said frame from said front supporting means to said intermediate support while the remaining portion of said frame remains supported by said wheels, and power means for moving said frame longitudinally relative to said intermediate support when the weight of said frame is received entirely by said wheels and said intermediate support.

13. In an apparatus of the character disclosed, an elongated frame, supporting wheels for the rear end of said frame, floor engaging supporting means for the front end of said frame, an intermediate support carried by said frame, power means connected to said frame and to said intermediate support for transferring the weight of said frame from said front supporting means to said intermediate support, power means for moving said frame longitudinally relative to said intermediate support when the weight of said frame is received by said intermediate support, and power means connected between said frame and said intermediate support for swinging said frame horizontally relative to said intermediate support while the forward portion of said frame is supported by said intermediate support.

14. In an apparatus of the character disclosed, an elongated frame, supporting wheels for the rear end of said frame, floor engaging supporting means for the front end of said frame, an intermediate support carried by said frame, power means connected to said frame and to said intermediate support for transferring the weight of said frame from said front supporting means to said intermediate support, power means for moving said frame longitudinally relative to said intermediate support when the weight of said frame is received by said intermediate support, and power means connected between said frame and said intermediate support for swinging said frame horizontally relative to said intermediate support while the forward portion of said frame is supported by said intermediate support, said first mentioned power means connected between said frame and said intermediate support operable to raise and lower the latter relative to said frame.

15. In an apparatus of the character disclosed, an elongated frame, supporting wheels for the rear end of said frame, floor engaging supporting means for the front end of said frame, an intermediate support carried by said frame, power means connected to said frame and to said intermediate support for transferring the weight of said frame from said front supporting means to said intermediate support, power means for moving said frame longitudinally relative to said intermediate support when the weight of said frame is received by said intermediate support, and power means connected between said frame and said intermediate support for swinging said frame horizontally relative to said intermediate support while the forward portion of said frame is supported by said intermediate support, said first mentioned power means connected between said frame and said intermediate support operable to raise and lower the latter, said last mentioned power means operable to move said intermediate support arcuately relative to said frame while the latter is supported by said front supporting means and said intermediate support is elevated.

16. In an apparatus of the character disclosed, a frame, a pair of rear supporting wheels for said frame, means for mounting said frame on said wheels to turn horizontally about an upright axis located midway between said wheels at the rear end of the apparatus, a front supporting and swinging device for said frame embodying a laterally shiftable floor engaging support and devices between said frame and said support for swinging said frame horizontally relative to said support about said upright axis.

17. In an apparatus of the character disclosed, a frame, rear supporting wheels for said frame, means for mounting said wheels to turn horizontally with said frame upon swinging of the latter, a front supporting and swinging device for said frame embodying a floor engaging support and devices between said frame and said support for swinging said frame horizontally relative to said support upon a pivot having an upright axis located midway between said rear wheels at the rear end of the apparatus, and a power jack device coaxial with the frame pivot and engageable with the floor for centering said pivot during horizontal swing of said frame while the rear end of the latter remains at least to a large extent supported by said rear wheels.

18. In an apparatus of the character disclosed, a frame, a rear floor engaging support for said frame, separately movable floor engaging supports for said frame, one of said last mentioned supports disposed at the front end of said frame and said other last mentioned support located rearwardly of said front support but in advance of said rear support intermediate said front and rear supports, power operated means for alternately raising and lowering said last mentioned supports to effect transfer of a substantial portion of the weight of said frame back and forth from one support to the other while the rear portion of said frame is supported by said rear support, and means for moving said frame longitudinally relative to said intermediate support when said front support is relieved of the weight of said frame and for moving said intermediate support longitudinally relative to said frame while the latter is supported by said front and rear supports.

19. In an apparatus of the character disclosed, a frame, front and rear floor engaging supports for said frame, power operated means for alternately raising and lowering said supports whereby a substantial portion of the weight of said frame is transferred back and forth from one support to the other, means for moving said frame longitudinally relative to said rear support when said front support is relieved of the weight of said frame and for moving said rear support longitudinally relative to said frame while the latter is supported by said front support, and power operated means for swinging said frame horizontally relative to said front support when the latter is in frame-supporting position and for moving said front support arcuately relative to said frame when the latter is supported by said rear support.

20. In an apparatus of the character disclosed, a frame, supporting means therefor, a floor engaging member having a flat bottom surface adapted to rest on a floor surface, power operated means for moving said member downwardly relative to said frame into engagement with the floor whereby at least a substantial portion of the weight of said frame is transferred from said supporting means to said member, and power operated means connected to said frame and said member for swinging said frame horizontally about an upright axis while said member remains in supporting engagement with the floor, said second mentioned power operated means effective to move said member arcuately relative to said frame along a path struck on a radius extending from said upright axis when said frame is supported by said supporting means and said member is relieved of the weight of said frame.

21. In an apparatus of the character disclosed, a frame, supporting means therefor, a floor engaging member having a flat bottom surface adapted to rest on a floor surface, power operated means for moving said member downwardly relative to said frame into engagement with the floor whereby at least a substantial portion of the weight of said frame is transferred from said supporting means to said member, power operated means connected to said frame and said member for swinging said frame horizontally about an upright axis while said member remains in supporting engagement with the floor, said second mentioned power operated means effective to move said member arcuately relative to said frame along a path struck on a radius extending from said upright axis when said frame is supported by said supporting means and said member is relieved of the weight of said frame, and power operated means for moving said frame longitudinally relative to said member while the frame is supported by said member and for moving said member longitudinally relative to said frame when said member is relieved of the weight of said frame.

22. In an apparatus of the character disclosed, a frame, supporting means for the rear end of said frame, and a creeper device for supporting the forward portion of said frame and including relatively movable elements movable alternately along an arcuate path over a floor surface for swinging said frame step by step horizontally about an upright axis located at the rear end of the apparatus, and power operated means for successively elevating, lowering and alternately arcuately moving said elements.

23. In an apparatus of the character disclosed, a frame, supporting means for the rear end of said frame, and a creeper device for moving said frame step by step along rectilinear and curvilinear paths over a floor surface, said creeper device supporting the forward portion of said frame and including relatively movable elements movable along an arcuate path over a floor surface for swinging said frame step by step horizontally about an upright axis located at the rear end of the apparatus, power operated means for elevating, lowering and relatively arcuately moving said elements, and means including elements of said creeper device for effecting step by step longitudinal movement of said frame over the floor, said last mentioned means including power operated means for moving said elements longitudinally of said frame when said elements are elevated and for moving said frame longitudinally of said elements when a substantial portion of the weight of said frame is received by said elements.

24. In an apparatus of the character disclosed, a frame, and a creeper base for supporting said frame for movements along rectilinear and curvilinear paths over a floor surface, said base supporting said frame for movement step by step longitudinally and for swinging said frame step by step horizontally, said creeper base comprising a floor engaging support for supporting the front end of said frame, means for moving said support into frame supporting engagement with the floor, means connected between said frame and said support for moving said frame longitudinally when said support is in supporting engagement with the floor, and means connected between said frame and said support for swinging said frame horizontally relative to said support, said last mentioned means including a movable swing effecting element connected to an element movable longitudinally with said frame relative to said support.

25. In an apparatus of the character disclosed, a creeper base movable step by step rectilinearly and curvilinearly over a floor surface, said creeper base including a floor engaging support, a frame carried thereby and mounted thereon to swing horizontally relative thereto, fluid operated means for lowering said support into frame supporting engagement with the floor and for elevating said support, fluid operated means for swinging said frame horizontally relative to said support when the latter is in frame supporting engagement with the floor, a source of fluid under pressure, and means for automatically effecting operation of either of said fluid operated means step by step in a definite sequence including an automatic fluid distributing valve for controlling fluid flow from said source to said fluid operated means and means for connecting said fluid operated means for control by said automatic distributing valve.

26. In an apparatus of the character disclosed, a creeper base movable step by step rectilinearly and curvilinearly over a floor surface, said creeper base including a floor engaging support, a frame carried thereby and mounted thereon to swing horizontally relative thereto, fluid operated means for lowering said support into frame supporting engagement with the floor and for elevating said support, fluid operated means for moving said frame longitudinally relative to said support when the latter is in floor engaging position, fluid operated means for swinging said frame horizontally relative to said support when the latter is in supporting engagement with the floor, a source of fluid under pressure, and means for automatically effecting operation of either of said fluid operated means step by step in a definite sequence including an automatic fluid distributing valve for controlling fluid flow from said source to said fluid operated means, and means for connecting either of said fluid operated means for control by its automatic distributing valve.

27. In an apparatus of the character disclosed, a frame, and a creeper base for moving said frame step by step in a longitudinal direction and for swinging said frame step by step laterally about an upright axis located at the rear end of the apparatus, said creeper base including a forwardly located floor engaging shoe providing an arcuate guideway, an arcuate guide element guided for movement along said guideway, means for successively moving said guide element arcuately along said guideway, for removing a substantial portion of the weight of said frame from said shoe and for moving said shoe arcuately relative to said guide element, means for moving said shoe longitudinally relative to said frame and for moving said frame longitudinally relative to said shoe, and means for supporting said frame during said arcuate and longitudinal movements of said shoe relative to said frame.

28. An apparatus as set forth in claim 27 wherein means is provided for removing a substantial portion of the weight of said frame from said shoe during arcuate and longitudinal movements thereof relative to said frame.

29. An apparatus as set forth in claim 28 wherein said means for arcuately and longitudinally moving said shoe and for removing a substantial portion of the weight of said frame from said shoe include extensible power devices.

30. An apparatus as set forth in claim 27 wherein said means for supporting said frame during arcuate and longitudinal movements of said shoe include front and rear floor engaging supports, said shoe being arranged longitudinally of said frame intermediate said front and rear supports.

31. In an apparatus of the character disclosed, a frame, and a creeper base for said frame for moving said frame step by step in a longitudinal direction and for swinging said frame step by step laterally over a floor surface comprising a forwardly located creeper device movable over the floor surface, said creeper device comprising a floor engaging shoe located near the front end of said frame, means for moving said shoe longitudinally and arcuately relative to said frame including a movement effecting element connected to an element movable longitudinally and arcuately with said frame relative to said shoe, and means for relieving said shoe of at least a substantial portion of the weight of said frame during said arcuate and longitudinal movements of said shoe.

32. An apparatus as set forth in claim 31 wherein front and rear supports are provided for said frame by which said frame is at least partially supported during such arcuate and longitudinal movements of said shoe.

33. In an apparatus of the character disclosed, a frame, and a creeper base for moving said frame step by step in a direction extending longitudinally of said frame and step by step laterally of said longitudinal direction, said base including a floor-engaging shoe providing a transverse guideway, a guide element guided for lateral movement along said guideway, means for successively moving said guide element along said guideway, for removing a substantial portion of the weight of said frame from said shoe and for moving said shoe transversely relative to said guide element, means for alternately moving said shoe longitudinally relative to said frame and for moving said frame longitudinally relative to said shoe, means for supporting a substantial portion of the weight of said frame during such longitudinal and lateral movements of said shoe relative to said frame, said means for moving said parts as aforesaid being actuated by fluid operated means, and means for automatically effecting operation of said moving means in a definite sequence including an automatic fluid distributing valve and means for connecting said several fluid operated means for control by said automatic distributing valve.

34. In an apparatus of the character disclosed, a frame, a rear floor engaging support for said frame, separately movable floor engaging supports for said frame and both disposed at the forward end portion of the latter, one of said separately movable supports located rearwardly of the other support but in advance of said rear support intermediate the latter and the foremost support, power operated means for alternately raising and lowering said separately movable supports to effect transfer of a substantial portion of the weight of said frame back and forth from one front support to the other while the rear portion of said frame is supported by said rear support, and means for moving said frame longitudinally relative to the intermediate one of said supports when the foremost support is relieved of the weight of said frame and for moving the intermediate one of said supports longitudinally relative to said frame while the latter is supported by said foremost and rear supports.

35. In an apparatus of the character disclosed, a frame, front and rearward floor engaging supports for said frame both disposed at the forward end portion of the latter, power operated means for alternately raising and lowering said supports whereby a substantial portion of the weight of said frame is transferred back and forth from one support to the other, means for moving said frame longitudinally relative to said rearward support when said front support is relieved of the weight of said frame and for moving said rearward support longitudinally relative to said frame while the latter is supported by said front support, and power operated means for swinging said frame horizontally relative to said front support when the latter is in frame-supporting position and for moving said front support arcuately relative to said frame when the latter is supported by said rearward support.

36. In an apparatus of the character disclosed, a frame, supporting means therefor including a rear support for said frame and separately movable, forwardly located, floor engaging supports for said frame disposed at the forward end portion of said frame a substantial distance in advance of said rear support, said rear support at all times supporting the rear end of said frame while the front end thereof is supported by one or the other of said forwardly located supports, power operated means for moving the rearward one of said forwardly located supports downwardly relative to said frame into engagement with the floor whereby at least a portion of the weight of said frame is transferred from the foremost of said forwardly located supports to the rearward one of said forwardly located supports, and power operated means connected to said frame and to an element of said rearward one of said forwardly located supports for swinging said frame horizontally about an upright axis while the rearward one of said forwardly located supports and said rear support remain in supporting engagement with the floor, said second mentioned power operated means effective to move said rearward one of said forwardly located supports arcuately relative to said frame along a path struck on a radius extending from said upright axis when said frame is supported by said rear support and the foremost one of said forwardly located supports and while said rearward one of said forwardly located supports is relieved of the weight of said frame.

References Cited in the file of this patent

UNITED STATES PATENTS

| 770,286 | Hamilton | Sept. 20, 1904 |
| 1,615,055 | Turner | Jan. 18, 1927 |
| 2,062,657 | Joy | Dec. 1, 1936 |
| 2,132,184 | Poche | Oct. 4, 1938 |
| 2,257,181 | McCarthy | Sept. 30, 1941 |
| 2,261,160 | Joy | Nov. 4, 1941 |
| 2,410,482 | Doberstein | Nov. 5, 1946 |
| 2,452,632 | Cameron | Nov. 2, 1948 |